Jan. 12, 1926.

J. A. McDANIEL 1,569,196

INSECT EXTERMINATOR

Filed Dec. 5, 1922

2 Sheets-Sheet 1

INVENTOR.

BY

ATTORNEY.

Jan. 12, 1926.

J. A. McDANIEL 1,569,196

INSECT EXTERMINATOR

Filed Dec. 5, 1922    2 Sheets-Sheet 2

INVENTOR.
BY
ATTORNEY.

Patented Jan. 12, 1926.

1,569,196

UNITED STATES PATENT OFFICE.

JAMES A. McDANIEL, OF SHAWNEE, OKLAHOMA.

INSECT EXTERMINATOR.

Application filed December 5, 1922. Serial No. 605,040.

*To all whom it may concern:*

Be it known that I, JAMES A. McDANIEL, a citizen of the United States, residing at Shawnee, in the county of Pottawatomie and State of Oklahoma, have invented a certain new and useful Invention in Insect Exterminators, of which the following is a specification, reference being had to the accompanying drawings.

This invention relates to an insect gathering and destroying mechanism for taking from vegetations in growth insects of various kinds that attack such growth as cotton, cereals, vegetables and like growths.

It is an object of the invention to use the hunter's lamp idea for the reason that when a hunter wears his lamp at night, the night animal is attracted by the light which is in front of the man and the gun, the light thereby obscuring the animal's view of the hunter and his gun. The same principle is here involved by a mechanical method of presenting the light mechanically, attracting the insect, grabbing him by suction, driving him by force to a place of cremation.

Figure 1:
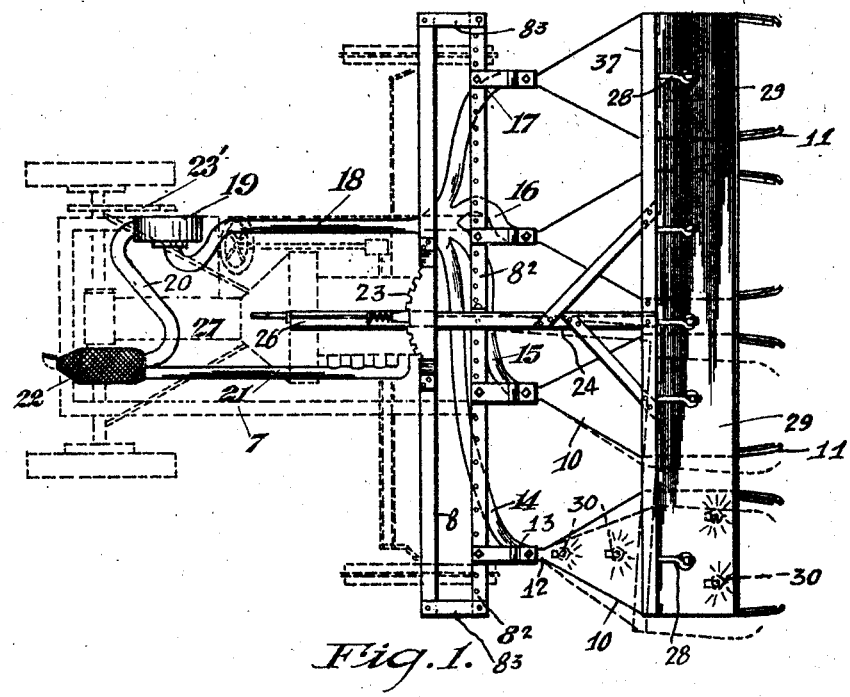
Figure 2:
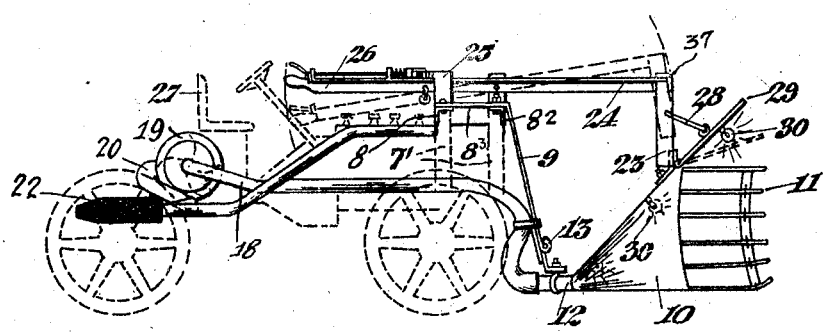
Figure 3:
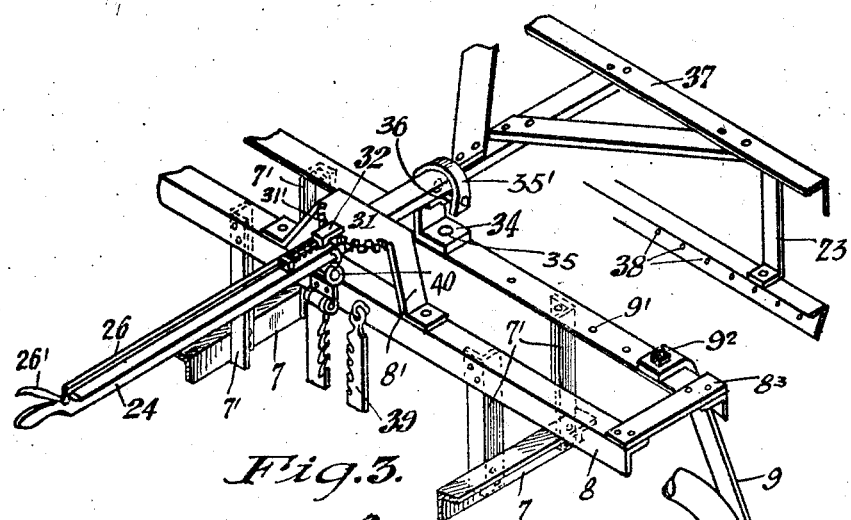
Figure 4:
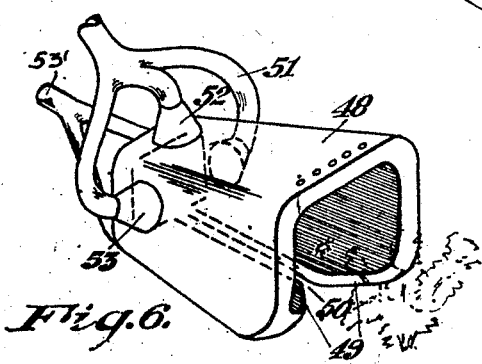
Figure 5:
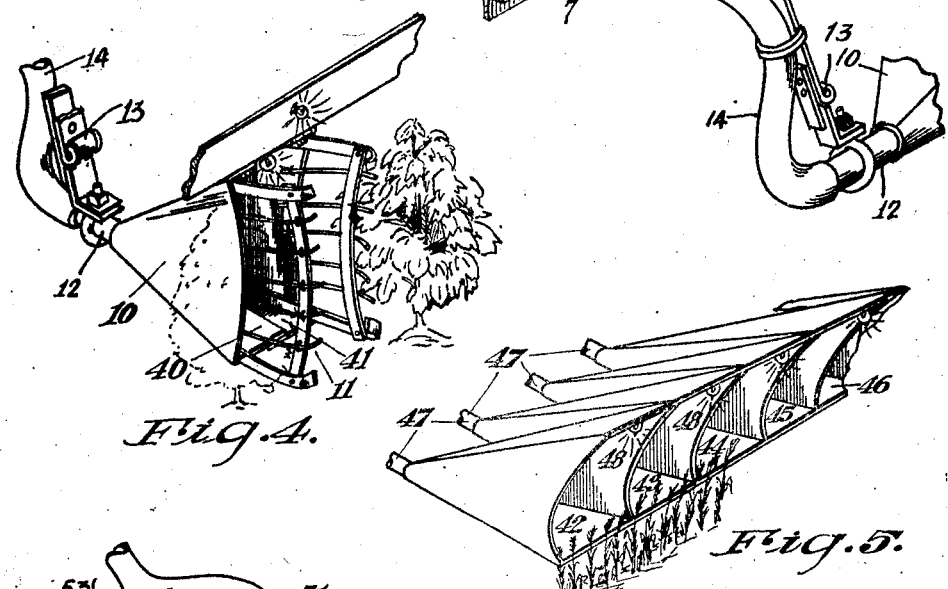
Figure 6:
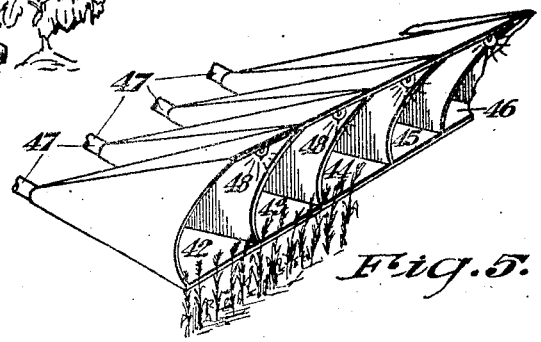

On the sheets of drawings, accompanying and forming a part of this specification, Figure 1 is a top plan view of a portion of the device, and diagrammatically showing a means of propulsion, Figure 2 is a similar view of the same, in side elevation, Figure 3 illustrates in perspective a view of framing, fragmented, a control lever, means for connecting same to a vehicle, and also showing other parts, Figure 4 illustrates, in perspective, a funnel or trap-mouth for large vegetation, Figure 5 illustrates a similar view of a funnel or a series of them for cereals, and Figure 6 is a perspective view of a funnel for the small vegetables.

In the views, like characters of reference will indicate like parts.

The device is designed to be forwardly carried at the front of a motive power vehicle, preferably, and from the chassis of which extends the angle-irons 7 upwardly wherefrom extends braces 7' that are attached to the cross-bars 8 and 8' and which, at their ends may be tied together by cross-braces 8², as seen in Figure 3. To the forward cross-bar 8' provided with a suitable number of bolt-holes 9' are secured braces 9 by bolts 9², that are adapted to support trap-funnels 10, having forwardly extended fingers 11, at their extremities inturned as at 11' and held in fixed position by bars 11² for the purpose of gathering and holding vegetation-stalks as seen in Figure 4, and these funnels recede to necks 12, that are coupled by a hinged joint 13 to the brace 9, and the end of the part 12 is coupled to a flexible hose-connection 14 to be attached to the suction line 18 running to the centre of the fan 19—it being understood from Figure 1 that these connections 14 may be duplicated as at 15, 16 and 17.

It will be noted that the suction line 18 enters the central portion of the fan 19, which is so arranged, because the suction of the fan is desired to draw the insects from the straps to the fan and thereafter to blow them out again by centrifugal force to the line 20 to the extremity 22 of the exhaust line 21 which is screen hooded to catch the insects and hold them for the blast from the exhaust to effect cremation. The fan may be operated from the running gear of the motive-power driven vehicle by a belt 23'.

Suitably associated with each trapping funnel 10 is a link 23 connected with a fulcrumed lever 24 running back to a standard 25 in which the same is journaled and continuing to a lever 26 adapted to be actuated from the seat 27 so that, as seen, the trapping funnel 10 may be raised and lowered, to suit vegetable growths. Means are provided to allow the lever 24 to swing laterally as seen in Figure 1 for shifting the trap-funnels 10.

Associated with the lever 24 of the shifting and adjusting mechanism for the trapping funnels 10 is a sub-link 28 which is attached to a reflector 29, and this reflector, as well as the interior of the trapping funnels is provided with illuminating lamps 30, in the present instance, electric lights which may be provided with current.

These lamps provide not only illumination for the interior of the traps 10 but also a pocket of illumination in the dark for the purpose of the device is to provide for its use at night time, and this forms a definite attraction for insects in swarms and thus provides a fine means for trapping insects.

Referring to Figure 3, for a more detailed description of the operation of lifting and shifting the funnel-traps 10, associated with the bar 38, a segment 31 is mounted upon a cross bar 8, and its arch 8' is sufficiently high to allow the lever 24 to move vertically and laterally thereunder. The teeth 31' on this segment co-operates with a latch 32 on the lever 26 to be controlled from the free end of the lever by the usual grip 26' at the free end of the lever as shown. On the cross bar 8² a bearing 34 is mounted in place on a stud 35 for axial movement and has an arched top 35' and a pin connection 36 acting as a fulcrum for the lever 24 and whereas the swiveled bearing 34 allows the lateral movement of the forward end or part of the lever 24.

This arrangement allows of both a lateral movement of the lever in either direction, and when it is desired to raise the funnel traps 10, through the pressing down on the lever 24, and through the links 23 attached to the bars 37 or 38 (see Figure 1) the hanging hooks 39 may be made to engage an eye 40 on the under side of the lever 26, and this is done by upturning the hook 39 and giving connection with the said eye 40. This may be done for lateral, uplifted, and also permanent uplifted position.

Before vertical adjustment of the levers 24—26 can be made, the latch 32 must be moved out of contact with the segment 31.

In Figure 4 is shown perspectively a trap-collector made of suitable and perhaps flexible material and this collector 10 is made adjustable by the overlapping of the parts 40 and 41, each part carrying its own set of fingers 11, and the contour of those sections of the collectors 10 are such, and so formed, as to conform generally to the contour of the vegetation with which it is intended to come into contact.

In Figure 5, there is shown perspectively a cereal collector trap, constituted generally of a series of juxtaposed and laterally arranged funnels 42, 43, 44, 45 and 46, and as many more as may be desirable. These each recede to a tube 47 that connects in any suitable way with the suction system and each compartment is associated with the illuminating system, giving its illumination from 48 as well as internally from the rear thereof.

The last view, Figure 6, shows a collector 48 provided with lower flanges 49 between which is a channel 40 through which certain stem-vegetation may pass and this device is provided with suction tubes 53 for drawing the insects into the main suction line and into the screen 22. This device, it will be understood will also be illuminated as is the case with the other trap-funnels.

The devices of Figures 5 and 6 respectively, may have their connections 47 and 51, 52 and 53 connected to the fan hose in substitution of 12, and the connection shown in Figure 3 surrounding the part 12 may hold the necks 47 and 53' of Figures 5 and 6. In these instances it will not be needed necessarily to provide for the elevation of these parts.

It will now be observed that there is provided an efficient means, including means for allurement or coaxing insects by illuminated attraction at night, and drawing them by suction into traps and through a suction line to a point where they will be forcibly rejected for cremation.

The collector traps are about the width as the distance between drills and the sides thereof are adjustable to vegetation in drills and to the contour thereof.

What I claim as new, and desire to obtain by Letters Patent is:—

1. A machine adapted to carry illuminated traps in front of it, comprising a vehicle frame, a trap supporting frame in front of said vehicle, a series of traps mounted on said frame, means to illuminate said traps, a lever swiveled on said vehicle frame, connections between said lever and said supporting frame so as to provide for free vertical and lateral movement of the traps and supporting frame, a collector carried on the vhicle, pipes communicating with said traps, and collector means for creating a suction in said pipes for conveying insects from said traps and delivering the same in said collector.

2. The combination as set forth in claim 1, in which means are provided for holding the swiveled lever in adjusted positions for holding the traps in pre-determined positions.

Signed at Oklahoma City, in the county of Oklahoma and State of Oklahoma, this 2nd day of November, in the year of our Lord, nineteen hundred and twenty-two.

JAMES A. McDANIEL.